US011979721B2

(12) United States Patent
Podhajny et al.

(10) Patent No.: US 11,979,721 B2
(45) Date of Patent: May 7, 2024

(54) WEARABLE DEVICE WITH DIRECTIONAL AUDIO

(71) Applicant: Apple Inc., Cupertino, CA (US)

(72) Inventors: Daniel A. Podhajny, Morgan Hill, CA (US); Joshua A. Hoover, Los Gatos, CA (US); Nicholas R. Trincia, San Francisco, CA (US); Yue Chen, San Jose, CA (US); Seul Bi Kim, Sunnyvale, CA (US); Chad J. Miller, Oakland, CA (US); Kristen L. Cretella, Mountain View (CA); Yi Zou, Santa Clara, CA (US); William Leith, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/208,217

(22) Filed: Jun. 9, 2023

(65) Prior Publication Data

US 2023/0319471 A1 Oct. 5, 2023

Related U.S. Application Data

(62) Division of application No. 17/383,260, filed on Jul. 22, 2021, now Pat. No. 11,716,567.

(Continued)

(51) Int. Cl.
*H04R 3/12* (2006.01)
*G10L 25/78* (2013.01)
(Continued)

(52) U.S. Cl.
CPC ................ *H04R 3/12* (2013.01); *G10L 25/78* (2013.01); *H04R 1/023* (2013.01); *H04R 1/403* (2013.01);
(Continued)

(58) Field of Classification Search
CPC .......... H04R 3/12; H04R 3/005; H04R 1/023; H04R 1/403; H04R 1/406;
(Continued)

(56) References Cited

U.S. PATENT DOCUMENTS 8,750,541 B1 6/2014 Dong et al.
9,525,938 B2 * 12/2016 Deshpande ............ H04R 3/005
(Continued)

FOREIGN PATENT DOCUMENTS

EP 3383061 10/2018

OTHER PUBLICATIONS

Chinese Office Action from Chinese Patent Application No. 202121961443.9, dated Jan. 27, 2022 (no translation).

(Continued)

*Primary Examiner* — William A Jerez Lora
(74) *Attorney, Agent, or Firm* — BAKERHOSTETLER

(57) ABSTRACT

A wearable device can provide an audio module that is operable to provide audio output from a distance away from the ears of the user. For example, the wearable device can be worn on clothing of the user and direct audio waves to the ears of the user. Such audio waves can be focused by a parametric array of speakers that limit audibility by others. Thus, the privacy of the audio directed to the user can be maintained without requiring the user to wear audio headsets on, over, or in the ears of the user. The wearable device can further include microphones and/or connections to other devices that facilitate calibration of the audio module of the wearable device. The wearable device can further include user sensors that are configured to detect, measure, and/or track one or more properties of the user.

20 Claims, 6 Drawing Sheets

Related U.S. Application Data

(60) Provisional application No. 63/081,784, filed on Sep. 22, 2020.

(51) Int. Cl.
*H04R 1/02* (2006.01)
*H04R 1/40* (2006.01)
*H04R 3/00* (2006.01)

(52) U.S. Cl.
CPC ............. *H04R 1/406* (2013.01); *H04R 3/005* (2013.01); *H04R 2201/025* (2013.01); *H04R 2201/401* (2013.01); *H04R 2420/07* (2013.01)

(58) Field of Classification Search
CPC ........ H04R 2201/025; H04R 2201/401; H04R 2420/07; G10L 25/78
USPC ................. 381/111, 122, 332, 334, 355, 386
See application file for complete search history.

(56) References Cited

U.S. PATENT DOCUMENTS

2014/0003622 A1 1/2014 Ikizyan et al.
2014/0241540 A1* 8/2014 Hodges ............... H04M 1/6066 381/74
2015/0230019 A1* 8/2015 Sakai ................... H04R 1/1041 381/74
2016/0021449 A1* 1/2016 Litovsky .............. H04R 5/0335 381/374
2016/0182996 A1* 6/2016 Takumai .............. H04R 29/002 381/303
2017/0039766 A1* 2/2017 Passmore ........... G02B 27/0176
2018/0324511 A1* 11/2018 Asada .................... H04R 3/005

OTHER PUBLICATIONS

Invitation to Pay Additional Fees from PCT/US2021/044214, dated Nov. 26, 2021, 13 pages.
International Search Report and Written Opinion from PCT/US2021/044214, dated Jan. 27, 2022, 18 pages.
Korean Office Action from Korean Patent Application No. 10-2023-7009575, dated Feb. 29, 2024, 8 pages including machine-generated English language translation.

* cited by examiner

WEARABLE DEVICE WITH DIRECTIONAL AUDIO

CROSS-REFERENCE TO RELATED APPLICATION

This application is a divisional of U.S. patent application Ser. No. 17/383,260, entitled "WEARABLE DEVICE WITH DIRECTIONAL AUDIO", filed on Jul. 22, 2021, which claims the benefit of U.S. Provisional Application No. 63/081,784, entitled "WEARABLE DEVICE WITH DIRECTIONAL AUDIO," filed Sep. 22, 2020, the entirety of which is incorporated herein by reference.

TECHNICAL FIELD

The present description relates generally to wearable devices, and, more particularly, to wearable devices with directional audio.

BACKGROUND

Audio headsets have acoustic speakers that sit on, over, or in the ear of the user. They can connect to other devices operate as sources of audio signals that are output by the speakers. Some headsets can isolate the user from ambient sounds and even provide noise-cancellation features. However, many audio headsets are somewhat obtrusive to wear and can inhibit the user's ability to hear ambient sounds or simultaneously interact with others near the user.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Audio headsets have acoustic speakers that sit on, over, or in the ear of the user. They can connect to other devices operate as sources of audio signals that are output by the speakers. Some headsets can isolate the user from ambient sounds and even provide noise-cancellation features.

However, many audio headsets are somewhat obtrusive to wear and can inhibit the user's ability to hear ambient sounds or simultaneously interact with others near the user. As such, many audio headsets can limit the user's desired experience with both the audio output of the headset and the audio from other sources.

Embodiments of the present disclosure provide a wearable device with an audio module that is operable to provide audio output from a distance away from the ears of the user. For example, the wearable device can be worn on clothing of the user and direct audio waves to the ears of the user. Such audio waves can be focused by a parametric array of speakers that limit audibility by others. Thus, the privacy of the audio directed to the user can be maintained without requiring the user to wear audio headsets on, over, or in the ears of the user. The wearable device can further include microphones and/or connections to other devices that facilitate calibration of the audio module of the wearable device. The wearable device can further include user sensors that are configured to detect, measure, and/or track one or more properties of the user.

These and other embodiments are discussed below with reference to FIGS. 1-11. However, those skilled in the art will readily appreciate that the detailed description given herein with respect to these Figures is for explanatory purposes only and should not be construed as limiting.

Figure 1:
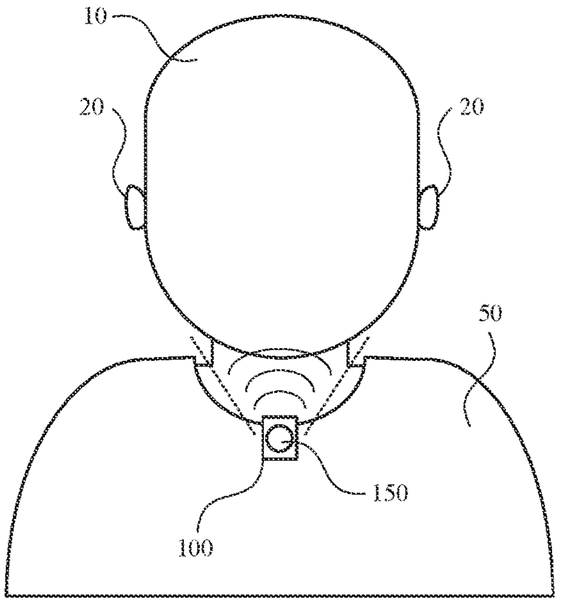
FIG. 1 illustrates a front view of a user wearing a wearable device with an audio module for directing sound waves to the ears of the user, according to some embodiments of the present disclosure.

FIG. 1 illustrates a front view of a user wearing a wearable device with an audio module for directing sound waves to the ears of the user, according to some embodiments of the present disclosure. As shown in FIG. 1, the user 10 can wear the wearable device 100 on an object 50 (e.g., article of clothing), a portion of the body of the user 10, or at another location. Such locations can be selected by the user 10, and the wearable device 100 can calibrate its output accordingly, as described further herein.

The wearable device 100 can be positioned at a distance away from the ears 20 of the user 10 to allow the user to maintain observation and/or engagement with other sources of sound from an external environment. For example, the wearable device 100 can be about 1, 2, 3, 6, 9, or 12 inches away from one or both of the ears 20 while providing audible sound thereto. By further example, the wearable device 100 can be about 1, 2, 3, 4, 5, 6 feet away from one or both of the ears 20 while providing audible sound thereto. By allowing the wearable device 100 to be away from the ears 20 of the user, the user 10 can also receive audio waves from other sources. Additionally, other people can interact with the user without an assumption that the user is unavailable, such as if the user 10 were wearing audio headsets on, over, or in the ears 20.

The audio waves output by the audio module 150 of the wearable device 100 can be primarily directed to the ears 20 of the user 10 and not to other locations, such as other people near the user 10, as described further herein. As such, the sound output by the audio module 150 can remain substantially private to the user 10.

While the wearable device 100 is shown attached to an object 50 such as clothing worn by the user 10, it will be understood that the wearable device 100 and/or other wearable devices described herein can be coupled to other objects. For example, a wearable device can be attached directly to the user 10, to a device worn by the user 10, and/or a device near the user 10. By further example, a wearable device can be attached to an object near or in contact with the user, such as furniture, linens, pillows, and the like. A wearable device can be worn as the user 10 moves and/or attached to an object while the user 10 remains near the object. A wearable device can be alternately attached to one of a variety of objects at different times as desired by the user.

Figure 2:
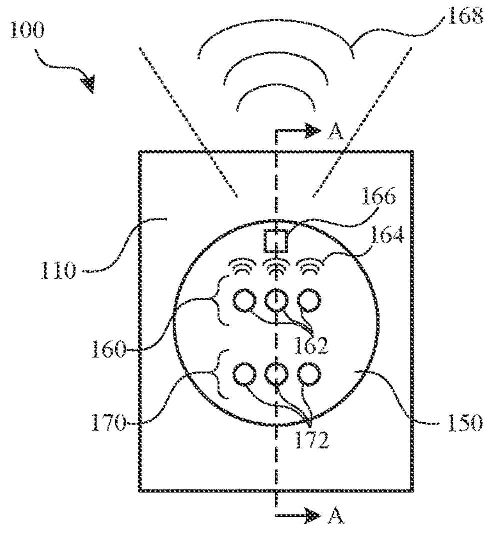
FIG. 2 illustrates a front view of a wearable device with an audio module having a first orientation with respect to a support structure, according to some embodiments of the present disclosure.

FIG. 2 illustrates a front view of a wearable device with an audio module and a support structure. As shown in FIG. 2, the wearable device 100 can include a support structure 110 and an audio module 150. The support structure can provide engagement with an object to which the wearable device 100 is to be attached, such as clothing or a body of the user.

The audio module 150 can include a parametric array 160 of speakers 162. The parametric array 160 is controlled to radiate beams of sound waves toward ears of a user. As used herein, a parametric array of speakers is one that produces sound through the heterodyning of two acoustic signals in a non-linear process that occurs in a medium such as air.

The parametric array 160 includes multiple speakers 162. The speakers 162 may be or include ultrasonic piezoelectric transducers, electrostatic transducers, electrostrictive transducers, and/or electro-thermo-mechanical film transducers. The speakers 162 can be arranged in a linear array or other known arrangement.

The speakers 162 can be configured to radiate beams of waves 164 (e.g., ultrasonic waves). At least one of the speakers 162 can emit a constant carrier wave (e.g., ultrasonic carrier wave), and at least one of the speakers 162 can emit a signal wave that includes audio data encoded thereon. Any pair of the speakers 162 can include different frequency components of the audio data from the signal wave. Additionally or alternatively, one or more ultrasonic waves 164 may be emitted as a carrier wave that is modulated or combined with a signal wave that includes audio data.

The ultrasonic waves 164 from the speakers 162 are demodulated by the non-linear characteristics of air, through which the waves travel. The waves 164 generally interact with each other according to the principle of wave superposition, wherein two or more waves 164 interact to produce another wave 168 characterized primarily by frequencies that result from a subtraction of the frequencies of the original waves 164. Thus, for example, a carrier wave with a constant frequency and a signal wave that encodes sound data at variable frequencies can interact to produce a beam of audible waves 168 having frequencies between about 20-20,000 Hz, which resides in the normal range of human hearing.

Accordingly, the signal wave can be controlled to interact with the carrier wave to reproduce the sound data encoded in the signal wave. For example, the ultrasonic waves 164 from each of the speakers 162 interact with each other and with the air to generate a beam of audible sound waves 168. The beam of audible sound waves 168 is directed to one or both ears of the user. By directing the beam of sound waves 168 toward an ear of the user, to possibility that someone other than the user can hear the audible sound waves 168 is minimized.

Additionally or alternatively, directionality of audio output can be provided based on structural features of the speakers 162 and/or surrounding structures. For example, one or more of the speakers 162 can include or be adjacent to a parabolic reflector that collects and focuses sound waves in a particular direction.

The audio module 150 can include an array 170 of multiple microphones 172. The microphones 172 can be spatially distributed evenly or unevenly. The microphones 172 can be positioned at various portions, such as on a front, rear, left, right, top, and/or bottom side of the audio module 150. The microphones 172 can be omnidirectional or directional.

One or more of the microphones 172 can be or include a directional microphone that is configured to be most sensitive to sound in a particular direction. Such directionality can be provided based on structural features of the microphone 172 and/or surrounding structures. For example, one or more of the microphones 172 can include or be adjacent to a parabolic reflector that collects and focuses sound waves from a particular direction onto a transducer. Based on the known directionality relative to other portions of the audio module 150, sound received by such a microphone 172 can be attributed to a source in a particular direction with respect to the audio module 150. Different microphones 172 can be oriented with different directionalities to provide an array of coverage that captures sounds from a variety of (e.g., all) directions.

An array of multiple microphones 172 can be operated to isolate a sound source and reject ambient noise and reverberation. For example, multiple microphones 172 can be operated to perform beamforming by combining sounds from two or more microphones to allow preferential capture of sounds coming from certain directions. In a delay-and-sum beamformer, sounds from each microphone 172 are delayed relative to sounds from the other microphones 172, and the delayed signals are added. The amount of delay determines the beam angle (e.g., the angle in which the array preferentially "listens"). When a sound arrives from this angle, the sound signals from the multiple phones are added constructively. The resulting sum is stronger, and the sound is received relatively well. When a sound arrives from another angle, the delayed signals from the various microphones 172 add destructively (e.g., with positive and negative parts of the sound waves canceling out to some degree) and the sum is not as loud as an equivalent sound arriving from the beam angle. For example, if a sound arrives at a microphone 172 on the right before it enters a microphone on the left, then it can be determined that the sound source is to the right of the array 170. During sound capturing, a processor (e.g., processor) can "aim" a capturing beam in a direction of the sound source. Beamforming allows the array 170 to simulate a directional microphone pointing toward the sound source. The directivity of the array 170 reduces the amount of captured ambient noises and reverberated sound as compared to a single microphone. This may provide a clearer representation of a sound source, such as speech and/or voice commands from the user's mouth. A beamforming microphone array 170 may made up of distributed omnidirectional microphones linked to a processor that combines the several inputs into an output with a coherent form. Arrays may be formed using numbers of closely spaced microphones. Given a fixed physical relationship in space between the different individual microphones 172, simultaneous digital signal processor (DSP) processing of the signals from each of the individual microphones in the array can create one or more "virtual" microphones.

Figure 3:
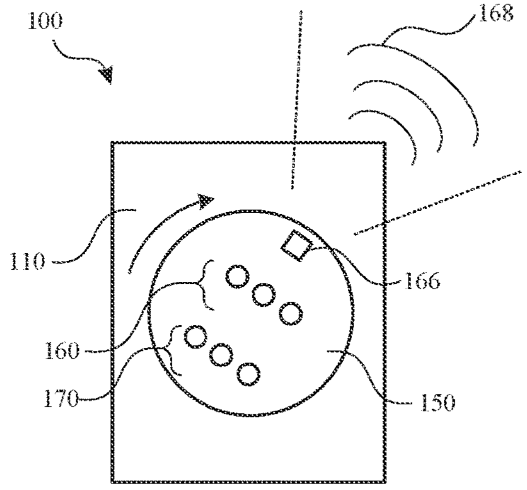
FIG. 3 illustrates a front view of the wearable device of FIG. 2 with the audio module having a second orientation with respect to the support structure, according to some embodiments of the present disclosure.

The sound waves 168 of the audio module 150 can be directed to the ears of the user by one or more of a variety of adjustment mechanisms. For example, the audio module 150 can be rotatably coupled to the support structure 110. The parametric array 160 of speakers 162 is configured to direct audio waves in a direction corresponding to a rotational orientation of the audio module 150 relative to the support structure 110. In FIG. 2, the audio module 150 has a first orientation with respect to the support structure 110. FIG. 3 illustrates a front view of the wearable device of FIG. 2 with the audio module having a second orientation with respect to the support structure, according to some embodiments of the present disclosure.

As shown in FIGS. 2 and 3, the audio module 150 can be rotated with respect to the support structure 110. The array 160 of speakers 162 can be configured to direct audio waves in a direction corresponding to a rotational orientation of the audio module 150 relative to the support structure 110.

Rotation of the audio module 150 can be manually controlled and/or controlled by an actuator based on signals and/or commands, as described further herein. As shown, the audio module 150 can be rotated in a plane, such as a plane parallel to an interface between the support structure 110 and the audio module 150, and/or about an axis. For example, the audio module 150 and the support structure 110 can be coupled by a pivot, shaft, or other coupling that facilitates rotation. Additionally or alternatively, the audio module 150 can be rotated in multiple planes and/or about multiple axis. For example, the audio module 150 and the support structure 110 can be coupled by a gimbal, ball and socket, or other coupling that facilitate multi-axial relative movement.

In some embodiments, the audible sound waves 168 can be steered by adjusting the amplitude and/or phase of one or more of the ultrasonic waves 164 with respect to the other ultrasonic waves 164. In one example, a delay or phase offset can be applied to one or more of the ultrasonic waves 164 so that the waves 164 interact with one another to produce sound waves 168 directed in a desired direction.

The audio module 150 can include an indicator 166 that indicates a direction and/or relative orientation of the audio module 150 with respect to the support structure 110. Such an indicator can guide a user when manually adjusting the audio module 150. In some embodiments, the indicator 166 comprises a light emitter configured to emit light when the audio module 150 is active. Such an indicator can alert others to the activity of the audio module 150, thereby notifying them that the user is receiving sound waves that others may not be able to hear.

Figure 4:
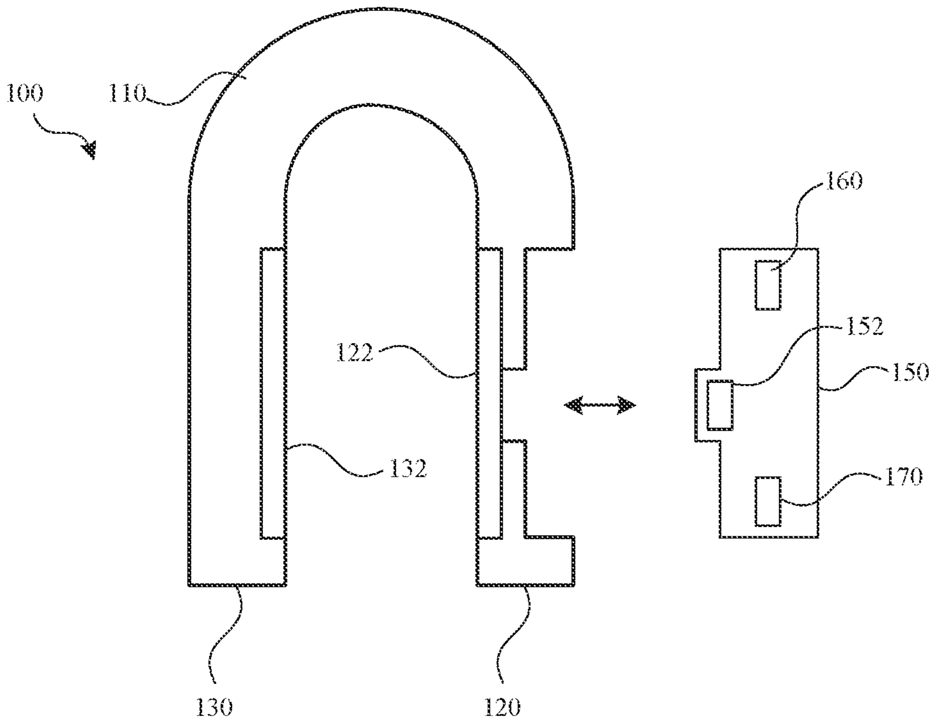
FIG. 4 illustrates a side view of the wearable device of FIG. 2 with the audio module separate from the support structure, according to some embodiments of the present disclosure.

FIG. 4 illustrates a side view of the wearable device of FIG. 2 with the audio module separate from the support structure, according to some embodiments of the present disclosure. The support structure 110 can include an inner portion 130 and an outer portion 120. The outer portion can support the audio module 150 in a manner that allows it to be within range of the user's ears. The inner portion 130 can optionally be on an opposing side of an object to which the support structure is attached.

The support structure 110 can include one or more of a variety of materials, including but not limited to fabrics, polymers, metal, leather, and the like. The support structure 110 can provide bending and/or flexing by the selection of material and/or by mechanical connections, such as between the inner portion 130 and the outer portion 120.

The support structure 110 and/or the audio module 150 can be selected to provide a variety of different components and functions to achieve the results that are desired by a user. For example, a wearable device 100 can be provided with an audio module 150 that can be detached from the support structure 110. A support structure attachment element (e.g., outer portion attachment element 122 at an outer portion 120) of the support structure 110 can interact with an audio module attachment element 152 of the audio module 150 to provide a secure and reversible coupling. The modular configurations allow a user to easily customize one or more support structures with one or more audio modules to provide features that integrate with other operations of the support structure of the wearable device. The support structures 110 and/or the audio modules 150 can be easily exchanged with each other to provide different components and functions at different times.

As used herein, "modular" or "module" can refer to a characteristic that allows an item, such as an audio module, to be connected, installed, removed, swapped, and/or exchanged by a user in conjunction with another item, such as a support structure of a wearable device. Connection of an audio module with a support structure can be performed and reversed, followed by disconnection and connection of another audio module with the same support structure or another support structure with the same audio module. As such, multiple audio modules can be exchangeable with each other with respect to a given support structure. Further, multiple support structures can be exchangeable with each other with respect to a given audio module.

An audio module can be connected to a support structure in a manner that allows the audio module to be removed thereafter. The connection can be fully reversible, such that when the audio module and the support structure are disconnected, each is restored to a condition held prior to the connection. The connection can be fully repeatable, such that after the audio module and the support structure are disconnected, the same or a different support structure and audio module pair can be connected in the same way. The audio module and support structure can be securely and temporarily connected, rather than permanently, fixedly, or resiliently connected (e.g., via chemical and/or molecular bond). For example, connection and disconnection of the audio module and support structure are facilitated in a manner that does not cause permanent damage, harm, or deformation to the audio module or the support structure.

An audio module and a support structure can be connected in a manner that optionally secures the relative positions of the audio module and the support structure with respect to each other and/or allows a degree of relative movement, such as relative rotation as described herein.

Figure 5:
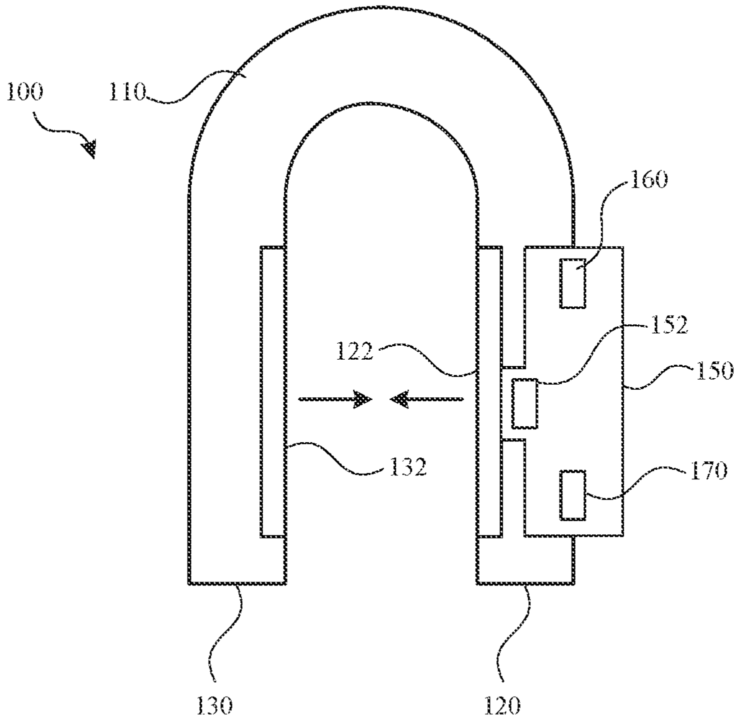
FIG. 5 illustrates a side view of the wearable device of FIG. 4 with the audio module installed in the support structure, according to some embodiments of the present disclosure.

FIG. 5 illustrates a side view of the wearable device of FIG. 4 with the audio module installed in the support structure, according to some embodiments of the present disclosure. The inner portion 130 of the support structure 110 can include an inner portion attachment element 132 and the outer portion 120 of the support structure 110 can include an outer portion attachment element 122 configured to couple to the inner portion attachment element 132 and engage an object. The object can include an article of clothing, another wearable device, and/or a part of the user's body. The outer portion attachment element 122 can be configured to couple to the inner portion attachment element 132 when the support structure 110 is folded onto opposing sides of the object.

One or more of a variety of mechanisms can be provided to engage the outer portion attachment element 122 to the inner portion attachment element 132. For example, mechanisms such as slides, locks, latches, snaps, screws, clasps, threads, magnets, pins, an interference (e.g., friction) fit, knurl presses, bayoneting, and/or combinations thereof can be included to secure the inner portion 130 with respect to the outer portion 120. The inner portion 130 and the outer portion 120 can remain locked in a relative position and/or orientation until separate and/or a release mechanism is actuated.

The outer portion attachment element 122 can couple to both the audio module 150 and the inner portion attachment element 132. For example, each of the inner portion attachment element 132, the outer portion attachment element 122, and the audio module attachment element 152 can include a magnet. The attachment elements can magnetically couple to each other.

Figure 6:
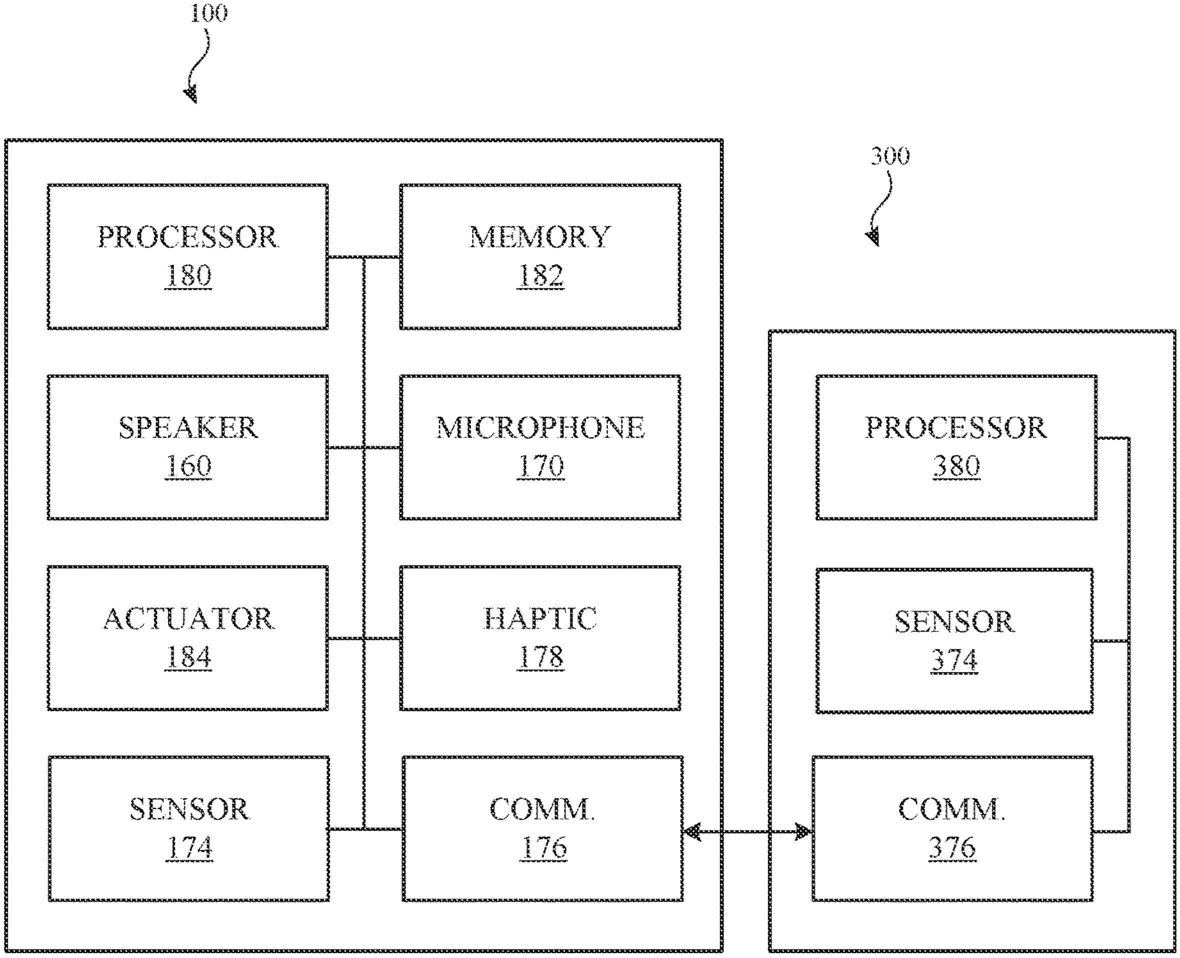
FIG. 6 illustrates a block diagram of a wearable device and an external device, in accordance with some embodiments of the present disclosure.

FIG. 6 illustrates a block diagram of a wearable device and an external device, in accordance with some embodiments of the present disclosure. Components of the wearable device can be operably connected to provide the performance described herein. FIG. 6 shows a simplified block diagram of an illustrative wearable device 100 in accordance with one embodiment of the invention. It will be appreciated that components described herein can be provided on one, some, or all of an audio module, a support structure, and/or another component of the wearable device. It will be understood that additional components, different components, or fewer components than those illustrated may be utilized within the scope of the subject disclosure.

As shown in FIG. 6, the wearable device 100 can include a processor 180 (e.g., control circuitry) with one or more processing units that include or are configured to access a memory 182 having instructions stored thereon. The instructions or computer programs may be configured to perform one or more of the operations or functions described with respect to the wearable device 100. The processor 180 can be implemented as any electronic device capable of processing, receiving, or transmitting data or instructions. For example, the processor 180 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the wearable device 100. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The wearable device 100 can include adjustment control components described herein, such as an actuator 184, a motor, and the like for moving components to a desired relative position and/or orientation.

The wearable device 100 can include one or more sensors 174, as described herein. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics, heart rate, electrocardiographic (ECG) characteristics, galvanic skin resistance, and other electrical properties of the user's body.

The wearable device 100 can include the microphone array 170 as described herein. The microphone array 170 can be operably connected to the processor 180 for detection of sound levels and communication of detections for further processing, as described further herein.

The wearable device 100 can include the speaker array 160. The speaker array 160 can be operably connected to the processor 180 for control of audio output, including sound levels, as described further herein.

The wearable device 100 can include a communications element 176 for communicating with one or more servers or other devices, such as an external device 300, using any suitable communications protocol. For example, the communications element 176 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. The communications element 176 can also include an antenna for transmitting and receiving electromagnetic signals.

The wearable device 100 can include a battery, which can charge and/or power components of the wearable device 100. The battery can also charge and/or power components connected to the wearable device 100.

The wearable device 100 can optionally omit one or more types of input/output components, particularly where the wearable device 100 is operably connected to another device that provides an input/output component. For example, the wearable device 100 can optionally omit a display and/or a touchscreen.

The external device 300 can provide a processor that can include one or more of the features described herein with respect to the processor 180 of the wearable device 100.

The external device 300 can provide communications circuitry 178 that can include one or more of the features described herein with respect to the communications element 176 of the wearable device 100.

The wearable device 100 can include one or more sensors 374. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. The sensor 374 can be operated to detect a characteristic of the wearable device 100 and/or the user to determine whether calibration is needed, as described further herein. For example, the sensor can include an image sensor (e.g., camera), a microphone, and the like.

Figure 7:
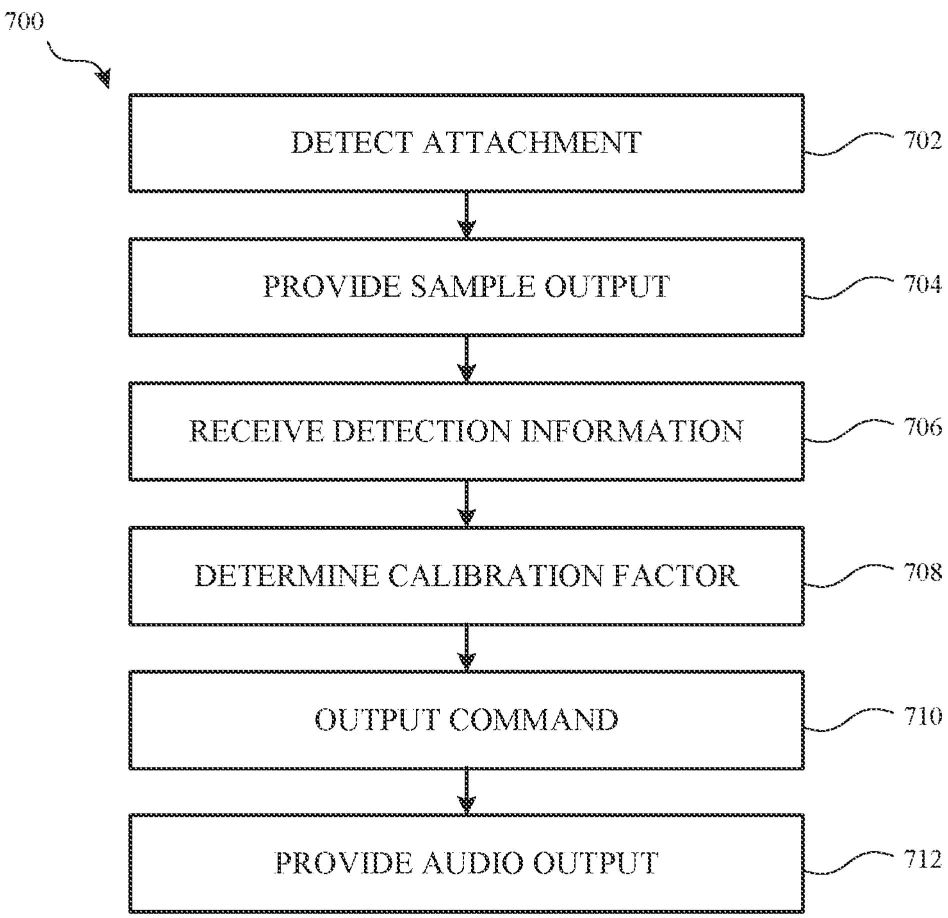
FIG. 7 illustrates a flow chart for a process for calibrating a wearable device, according to some embodiments of the present disclosure.

FIG. 7 illustrates a flow chart for a process for calibrating a wearable device, according to some embodiments of the present disclosure. For explanatory purposes, the process 700 is primarily described herein with reference to the wearable device 100 of FIGS. 1-6. However, the process 700 is not limited to the wearable device 100 of FIGS. 1-6, and one or more blocks (or operations) of the process 700 may be performed by different components of the wearable device and/or one or more other devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The process 700 can begin when the wearable device detects attachment, usage, proximity to the user, and/or another condition that indicates that the wearable device is or can be in use (702). Such a detection can be made by one or more sensors of the wearable device. Additionally or alternatively, the detection can be performed in response to an operational state of the wearable device (e.g., on/off state, application launch, user input command, and the like).

Based on the detection, the wearable device can provide a sample output for detection by an external device (704). For example, the speakers of the audio module can output a sample sound wave for detections of a headset worn temporarily by the user for calibration purposes. The headset can determine whether the sample sound wave was received and provide information regarding the detection. By further example, an external device can capture an image of the audio module and a user (e.g., ears) to determine whether proper alignment is achieved or needed.

Based on the detection by an external device, information can be transmitted for receipt by the wearable device (706).

Based on the information or the detection itself, the wearable device can determine whether and/or what calibration factor should be applied to optimize the audio output of the audio module to the ears of the user (708).

The wearable device can determine whether and/or what calibration factor should be applied to optimize the audio output of the audio module to the ears of the user (708).

Based on the calibration factor, the wearable device can output a command (710). The command can include an indicator to the user to adjust the rotational orientation of the audio module relative to the support structure. Additionally or alternatively, the command can include a signal to an actuator to adjust the rotational orientation of the audio module relative to the support structure. Optionally, no command need be output.

Based on the calibration factor, the wearable device can provide audio output (712). The audio output can be provided following confirmation that adjustments to the audio module are made. Additionally or alternatively, the audio output can be provided in a manner that adjusts the direction of audio wave radiation to be directed to the ears of the user, as described herein.

Figure 8:
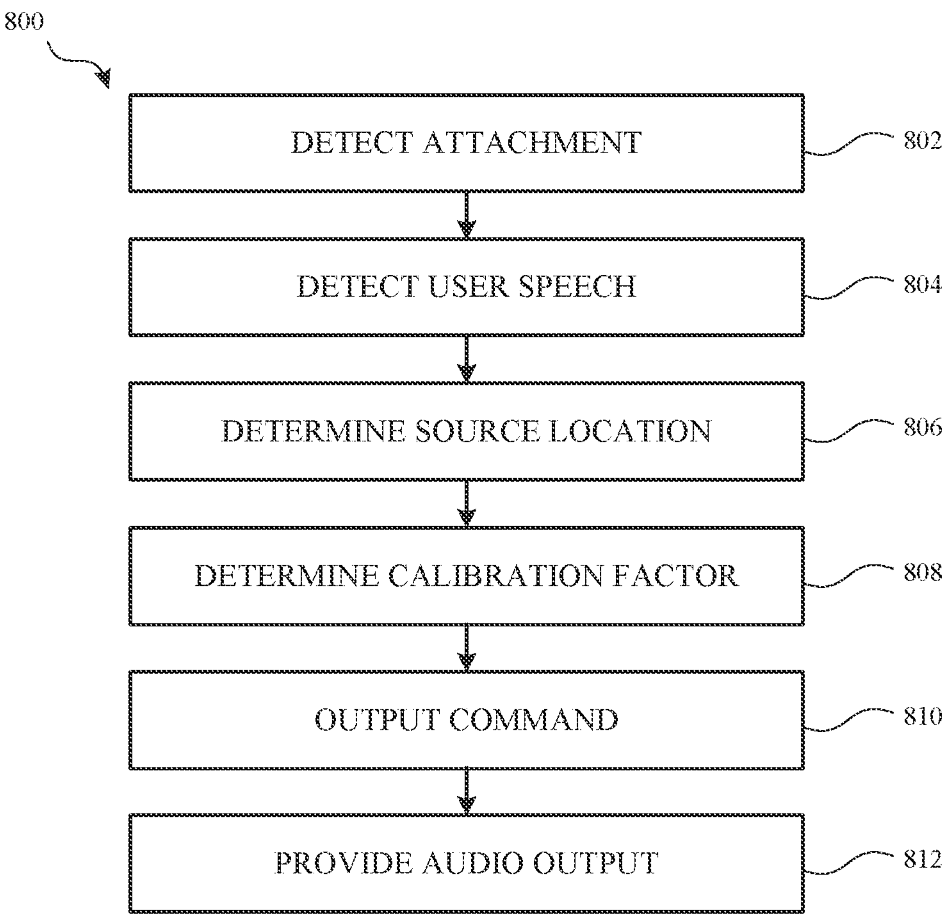
FIG. 8 illustrates a flow chart for a process for calibrating a wearable device, according to some embodiments of the present disclosure.

FIG. 8 illustrates a flow chart for a process for calibrating a wearable device, according to some embodiments of the present disclosure. For explanatory purposes, the process 800 is primarily described herein with reference to the wearable device 100 of FIGS. 1-6. However, the process 800 is not limited to the wearable device 100 of FIGS. 1-6, and one or more blocks (or operations) of the process 800 may be performed by different components of the wearable device and/or one or more other devices. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

The process 800 can begin when the wearable device detects attachment, usage, proximity to the user, and/or another condition that indicates that the wearable device is or can be in use (802). Such a detection can be made by one or more sensors of the wearable device. Additionally or alternatively, the detection can be performed in response to an operational state of the wearable device (e.g., on/off state, application launch, user input command, and the like).

Based on the detection, the wearable device can detect speech or other sound generated by the user (804). For example, the microphones of the audio module can receive sound waves and perform voice recognition or other analysis to determine that the sound is from the user.

Based on the detection of sound from the user, the source location of the sound (e.g., mouth of the user) can be determined, as described herein (806).

Based on the source location, the wearable device can determine whether and/or what calibration factor should be applied to optimize the audio output of the audio module to the ears of the user (808). For example, once the location of the mouth with respect to the audio module is known, the location of the ears with respect to the audio module can be determined or approximated.

Based on the calibration factor, the wearable device can output a command (810). The command can include an indicator to the user to adjust the rotational orientation of the audio module relative to the support structure. Additionally or alternatively, the command can include a signal to an actuator to adjust the rotational orientation of the audio module relative to the support structure. Optionally, no command need be output.

Based on the calibration factor, the wearable device can provide audio output (812). The audio output can be provided following confirmation that adjustments to the audio module are made. Additionally or alternatively, the audio output can be provided in a manner that adjusts the direction of audio wave radiation to be directed to the ears of the user, as described herein.

Figure 9:
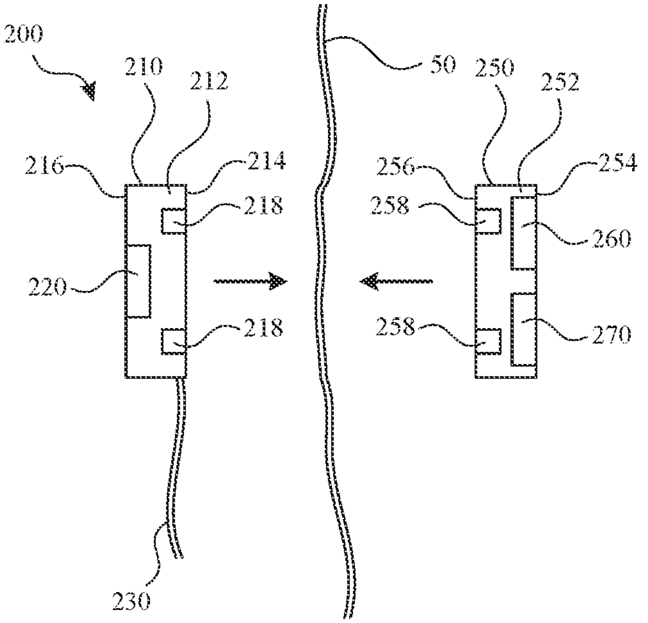
FIG. 9 illustrates a side view of a wearable device having an audio module and a sensor module, according to some embodiments of the present disclosure.

A wearable device can be formed as an assembly of separate modules. FIG. 9 illustrates a side view of a wearable device 200 having an audio module 250 and a sensor module 210, according to some embodiments of the present disclosure.

The audio module 250 can be positioned (e.g., on an outer surface of an object 50, such as clothing) to provide audio output to a user and receive audio input from a user. As shown in FIG. 9, the audio module 250 can include an audio module body 252 having an inner side 256 and an outer side 254, opposite the inner side 256. The audio module 250 can include an array 260 of speakers 262 on the outer side 254 of the audio module body 252. The array 260 of speakers 262 can include one or more of the features described herein with respect to the array 160 of speakers 162 of the wearable device 100. The audio module 250 can include an array 260 of microphones 272 on the outer side 254 of the audio module body 252. The array 270 of microphones 272 can include one or more of the features described herein with respect to the array 170 of microphones 172 of the wearable device 100.

The sensor module 210 can be positioned (e.g., on an inner surface of the object 50, such as clothing) to perform monitoring of the user. As further shown in FIG. 9, the sensor module 210 can include a sensor module body 212 having an inner side 216 and an outer side 214, opposite the inner side 216. The sensor module 210 can include a user sensor 220 on the inner side 216 of the sensor module body 212 and being configured to detect a property of a user wearing the wearable device 200. The sensor module 210 can include a connector 230 for receiving power from a power source.

Figure 10:
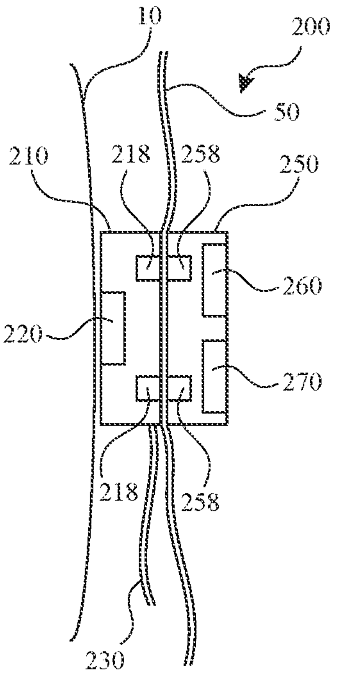
FIG. 10 illustrates a side view of the wearable device of FIG. 9 installed on an object and near a user, according to some embodiments of the present disclosure.

FIG. 10 illustrates a side view of the wearable device of FIG. 9 installed on an object and near a user, according to some embodiments of the present disclosure. As shown in FIG. 10, the audio module 250 can include one or more audio module attachment elements 258 on the inner side 256 of the audio module body 252, and the sensor module 210 can include one or more sensor module attachment elements 218 on the outer side 214 of the sensor module body 212. The audio module attachment elements 258 and the sensor module attachment elements 218 are configured to couple to each other and engage an object 50 (e.g., clothing) that is between the audio module 250 and the sensor module 210. As such, the audio module 250 and the sensor module 210 can be secured relative to each other and to the object.

Figure 11:
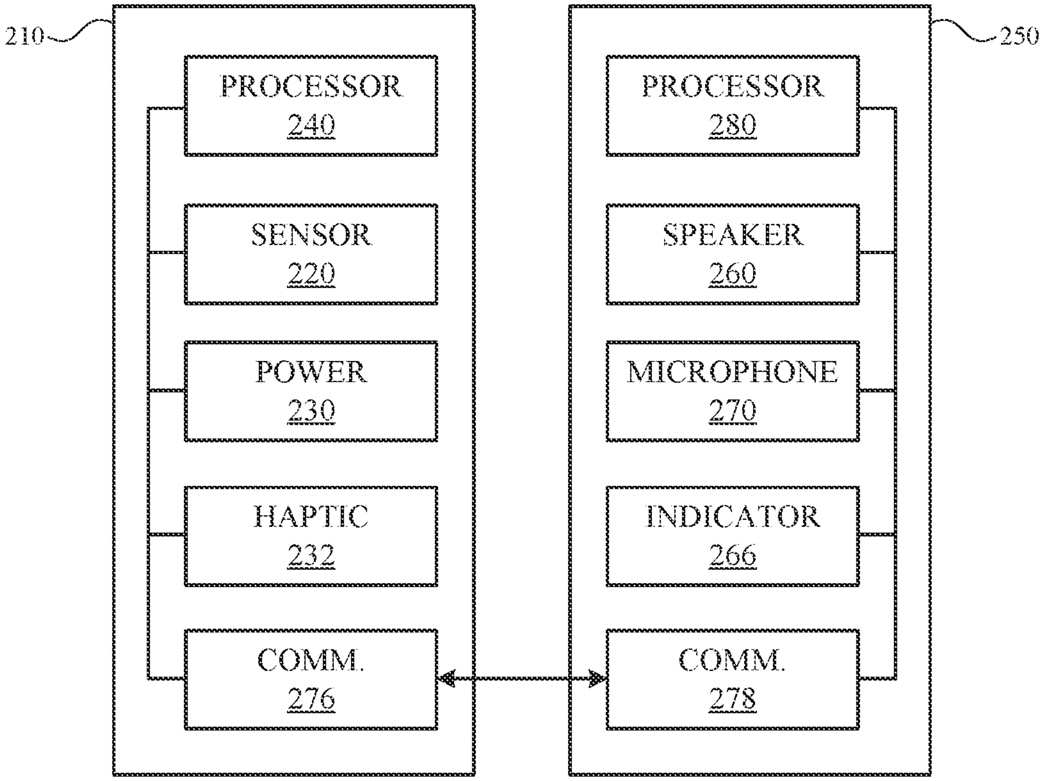
FIG. 11 illustrates a block diagram of a wearable device, in accordance with some embodiments of the present disclosure.

FIG. 11 illustrates a block diagram of a wearable device including an audio module and a sensor module, in accordance with some embodiments of the present disclosure. Components of the wearable device can be operably connected to provide the performance described herein. FIG. 11 shows a simplified block diagram of an illustrative wearable device 100 in accordance with one embodiment of the invention. It will be understood that additional components, different components, or fewer components than those illustrated may be utilized within the scope of the subject disclosure.

As shown in FIG. 11, the sensor module 210 can include a processor 240 (e.g., control circuitry) with one or more processing units that include or are configured to access a memory having instructions stored thereon. The processor 240 can include one or more of the features described herein with respect to the processor 180 of the wearable device 100.

The sensor module 210 can include one or more sensors 220. The one or more sensors 220 can include one or more of the features described herein with respect to the one or more sensors 174 of the wearable device 100.

The sensor module 210 can include a connector 230 for receiving power from a power source. The connector and/or another component can transmit power to the audio module, as needed. Such power transfer can occur between communication elements, attachment elements, and/or other mechanisms.

The sensor module 210 can include a haptic device 232 that can be implemented as any suitable device configured to provide force feedback, vibratory feedback, tactile sensations, and the like. For example, in one embodiment, the haptic device may be implemented as a linear actuator configured to provide a punctuated haptic feedback, such as a tap or a knock.

The sensor module 210 can include an audio module communication element 276. The audio module communication element 276 can include one or more of the features described herein with respect to the communication element 176 of the wearable device 100.

As further shown in FIG. 11, the audio module 250 can include a processor 280 (e.g., control circuitry) with one or more processing units that include or are configured to access a memory having instructions stored thereon. The processor 240 can include one or more of the features described herein with respect to the processor 180 of the wearable device 100.

The audio module 250 can include a speaker array 260. The speaker array 260 can include one or more of the features described herein with respect to the speaker array 160 of the wearable device 100.

The audio module 250 can include a microphone array 270. The microphone array 270 can include one or more of the features described herein with respect to the microphone array 170 of the wearable device 100.

The audio module 250 can include an indicator 266. The indicator 266 can include one or more of the features described herein with respect to the indicator 166 of the wearable device 100.

The audio module 250 can include an audio module communication element 278. The audio module communication element 278 can include one or more of the features described herein with respect to the communication element 176 of the wearable device 100.

Accordingly, embodiments of the present disclosure provide a wearable device with an audio module that is operable to provide audio output from a distance away from the ears of the user. For example, the wearable device can be worn on clothing of the user and direct audio waves to the ears of the user. Such audio waves can be focused by a parametric array of speakers that limit audibility by others. Thus, the privacy of the audio directed to the user can be maintained without requiring the user to wear audio headsets on, over, or in the ears of the user. The wearable device can further include microphones and/or connections to other devices that facilitate calibration of the audio module of the wearable device. The wearable device can further include user sensors that are configured to detect, measure, and/or track one or more properties of the user.

Various examples of aspects of the disclosure are described below as clauses for convenience. These are provided as examples, and do not limit the subject technology.

Clause A: a wearable device comprising: a support structure; an audio module rotatably coupled to the support structure, the audio module comprising a parametric array of speakers configured to direct audio waves in a direction corresponding to a rotational orientation of the audio module relative to the support structure.

Clause B: a wearable device comprising: a support structure comprising: an inner portion having an inner portion attachment element; and an outer portion having an outer portion attachment element configured to couple to the inner portion attachment element and engage an object; and an audio module comprising: an audio module attachment element configured to releasably couple to the outer portion attachment element of the support structure; an array of speakers; and an array of microphones.

Clause C: a wearable device comprising: an audio module comprising: an audio module body having an inner side and an outer side; an audio module attachment element on the inner side of the audio module body; an array of speakers on the outer side of the audio module body; and an array of microphones on the outer side of the audio module body; and a sensor module comprising: a sensor module body having an inner side and an outer side; a sensor module attachment element on the outer side of the sensor module body and being configured to couple to the outer attachment element and engage an object between the audio module and the sensor module; and a user sensor on the inner side of the sensor module body and being configured to detect a property of a user wearing the wearable device.

One or more of the above clauses can include one or more of the features described below. It is noted that any of the following clauses may be combined in any combination with each other, and placed into a respective independent clause, e.g., clause A, B, or C.

Clause 1: a processor configured to: with the parametric array of speakers, provide a first audio output; from an external device, receive information relating to detection of the first audio output; based on the information, determine a calibration factor; based on the calibration factor, output a command; and with the parametric array of speakers, provide a second audio output.

Clause 2: the command comprises an indicator to a user to adjust the rotational orientation of the audio module relative to the support structure.

Clause 3: the command comprises a signal to an actuator to adjust the rotational orientation of the audio module relative to the support structure.

Clause 4: the external device comprises a microphone and is configured to be worn at an ear of a user.

Clause 5: the audio module further comprises an array of microphones.

Clause 6: a processor configured to: with the array of microphones, detect speech from a user wearing the wearable device; based on the speech, determine a source location of the speech; based on the source location, determine a calibration factor; based on the calibration factor, output a command; and with the parametric array of speakers, provide an audio output.

Clause 7: the audio module further comprises a light emitter configured to emit light when the audio module is active.

Clause 8: the parametric array of speakers comprises: a first speaker configured to radiate ultrasonic carrier waves; and a second speaker configured to radiate ultrasonic signal waves, wherein the carrier waves are combined with the signal waves to produce a beam of audible waves having frequencies between about 20-20,000 Hz.

Clause 9: the audio module is configured to be rotatably coupled to the support structure.

Clause 10: the array of speakers is a parametric array of speakers configured to direct audio waves in a direction corresponding to a rotational orientation of the audio module relative to the support structure.

Clause 11: the each of the inner portion attachment element, the outer portion attachment element, and the audio module attachment element comprises a magnet.

Clause 12: the outer portion attachment element is configured to couple to the inner portion attachment element when the support structure is folded onto opposing sides of the object.

Clause 13: the sensor module further comprises a connector for receiving power from a power source.

Clause 14: the sensor module further comprises a haptic feedback component.

Clause 15: the sensor module further comprises an sensor module communication element; and the audio module further comprises an audio module communication element configured to wirelessly communicate with the sensor module communication element.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out"

of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A wearable device comprising:

an audio module comprising:

an audio module body having an inner side and an outer side;

an audio module attachment element on the inner side of the audio module body;

an array of speakers on the outer side of the audio module body; and an array of microphones on the outer side of the audio module body; and a sensor module comprising:

a sensor module body having an inner side and an outer side;

a sensor module attachment element on the outer side of the sensor module body and being configured to couple to the audio module attachment element and engage an object between the audio module and the sensor module; and a user sensor on the inner side of the sensor module body and being configured to detect a property of a user wearing the wearable device.

2. The wearable device of claim 1, wherein the sensor module further comprises a connector for receiving power from a power source.

3. The wearable device of claim 1, wherein the sensor module further comprises a haptic feedback component.

4. The wearable device of claim 1, wherein:

the sensor module further comprises a sensor module communication element; and the audio module further comprises an audio module communication element configured to wirelessly communicate with the sensor module communication element.

5. The wearable device of claim 4, wherein:

the sensor module communication element comprises a first antenna for transmitting or receiving electromagnetic signals; and the audio module communication element comprises a second antenna for transmitting or receiving the electromagnetic signals.

6. The wearable device of claim 1, wherein each of the audio module attachment element and the sensor module attachment element comprises a magnet.

7. The wearable device of claim 1, wherein the audio module comprises an indicator configured to indicate a direction or orientation of the audio module with respect to the audio module body.

8. The wearable device of claim 7, wherein the indicator comprises a light emitter configured to emit light when the audio module is active.

9. The wearable device of claim 1, wherein the array of speakers is a parametric array of speakers, the wearable device further comprising a processor configured to:

with the array of microphones, detect speech from the user;

based on the speech, determine a source location of the speech;

based on the source location, determine a calibration factor;

based on the calibration factor, output a command; and with the parametric array of speakers, provide an audio output.

10. A wearable device comprising:

an audio module defining an audio module inner side and an audio module outer side and comprising:

a first magnet on the audio module inner side;

an array of speakers on the audio module outer side; and an array of microphones on the audio module outer side; and a sensor module defining a sensor module inner side and a sensor module outer side and comprising:

a second magnet on the sensor module outer side and being configured to couple to the first magnet and engage an object between the audio module and the sensor module; and a user sensor on the sensor module inner side and being configured to detect a property of a user wearing the wearable device.

11. The wearable device of claim 10, wherein the sensor module further comprises a connector for receiving power from a power source.

12. The wearable device of claim 10, wherein the sensor module further comprises a haptic feedback component.

13. The wearable device of claim 10, wherein:

the sensor module further comprises a sensor module communication element; and the audio module further comprises an audio module communication element configured to wirelessly communicate with the sensor module communication element.

14. The wearable device of claim 13, wherein:

the sensor module communication element comprises a first antenna for transmitting or receiving electromagnetic signals; and the audio module communication element comprises a second antenna for transmitting or receiving the electromagnetic signals.

15. The wearable device of claim 10, wherein the audio module comprises an indicator having a light emitter configured to emit light when the audio module is active.

16. A wearable device comprising:

an audio module defining an audio module inner side and an audio module outer side and comprising:

an audio module attachment element on the audio module inner side;

an array of speakers on the audio module outer side;

an array of microphones on the audio module outer side; and a sensor module communication element; and a sensor module defining a sensor module inner side and a sensor module outer side and comprising:

a sensor module attachment element on the sensor module outer side and being configured to couple to the audio module attachment element and engage an object between the audio module and the sensor module;

a user sensor on the sensor module inner side and being configured to detect a property of a user wearing the wearable device; and an audio module communication element configured to transfer power between the audio module and the sensor module.

17. The wearable device of claim 16, wherein the sensor module further comprises a connector for receiving power from a power source.

18. The wearable device of claim 16, wherein the sensor module further comprises a haptic feedback component.

19. The wearable device of claim 16, wherein each of the audio module attachment element and the sensor module attachment element comprises a magnet.

20. The wearable device of claim 16, wherein the audio module further comprises an indicator having a light emitter configured to emit light when the audio module is active.

* * * * *